United States Patent
Regis et al.

(10) Patent No.: US 7,552,629 B2
(45) Date of Patent: Jun. 30, 2009

(54) MOVABLE TYRE TEST BENCH AND METHOD THEREFOR

(75) Inventors: Olivier Regis, Toulouse (FR); Nicolas Lastere, Auzeville Tolosane (FR); Gerard Sevelinge, Chalon sur Saone (FR)

(73) Assignee: AIRBUS France, Toulouse (FR)

( * ) Notice: Subject to any disclaimer, the term of this patent is extended or adjusted under 35 U.S.C. 154(b) by 402 days.

(21) Appl. No.: 10/588,907

(22) PCT Filed: Feb. 9, 2005

(86) PCT No.: PCT/FR2005/050080
§ 371 (c)(1),
(2), (4) Date: Aug. 9, 2006

(87) PCT Pub. No.: WO2005/078407
PCT Pub. Date: Aug. 25, 2005

(65) Prior Publication Data
US 2008/0282789 A1    Nov. 20, 2008

(30) Foreign Application Priority Data
Feb. 11, 2004 (FR) .................................. 04 50244

(51) Int. Cl.
*G01M 17/02* (2006.01)

(52) U.S. Cl. ........................................................ 73/146
(58) Field of Classification Search .................... 73/146
See application file for complete search history.

(56) References Cited

U.S. PATENT DOCUMENTS

| | | | |
|---|---|---|---|
| 3,483,744 A | 12/1969 | Goldberg | |
| 3,977,243 A | 8/1976 | Yamada et al. | |
| 3,982,430 A * | 9/1976 | Pommellet et al. | ............ 73/146 |
| 4,238,954 A | 12/1980 | Langer | |
| 6,584,835 B2 * | 7/2003 | Jenniges et al. | ............... 73/146 |
| 6,779,391 B2 * | 8/2004 | Bosl | ........................... 73/146 |
| 6,892,612 B2 * | 5/2005 | Poling, Sr. et al. | ............ 82/101 |
| 2001/0032499 A1 * | 10/2001 | Jenniges et al. | ............... 73/146 |
| 2008/0216567 A1 * | 9/2008 | Breed | ........................ 73/146.5 |

* cited by examiner

*Primary Examiner*—Andre J Allen
(74) *Attorney, Agent, or Firm*—Oblon, Spivak, McClelland, Maier & Neustadt, P.C.

(57) ABSTRACT

A mobile test rig for tires, composed of a self-driven platform capable of following rectilinear and circular trajectories and including: a test instrument module for a wheel-tire assembly to be tested that permits the assembly to be orientated in all directions, to lean the assembly and apply a vertical effort to the assembly, first swivelling axles, equipped with suspensions and driving wheels, a processing unit associated to a memory, and a control of the test cycle permitting orientation of the assembly to be controlled, as well as a load applied to the assembly.

29 Claims, 4 Drawing Sheets

MOVABLE TYRE TEST BENCH AND METHOD THEREFOR

TECHNICAL FIELD

This invention relates to a mobile test rig for tyres, and an implementation process for such a test rig.

STATE OF THE PRIOR TECHNIQUE

Tyre manufacturers have test rigs for testing different parameters of their tyres, such as resistance to impact, erosion in contact with the road, at speed, under load and the deformation when, skidding.

Such test rigs may be fixed or mobile.

A fixed test rig is described in the document mentioned in reference [1] at the end of the description. In this test rig, a wheel equipped with a tyre to be tested is mounted on a spindle above a flat conveyor belt so that it may come into contact with it under determined loads, and with the possibilities of adjusting the curve and direction. The conveyor belt actuated by a motor may consequently be used to test the said tyre by simulating determined road conditions.

A mobile test rig is described in the document mentioned in reference [2]. This test rig comprises a tractor unit, an articulated chassis connected to the tractor unit, a mechanism for driving a wheel equipped with a tyre to be tested, whose spindle is connected to measuring elements attached to the chassis, a mechanism for compensating the reaction moment, measuring elements, recording devices and a hydraulic device for applying loads to the wheel. This test rig permits the said tyre to be tested in actual conditions of use.

This test rig is adapted to tyres used on cars, trucks or tractors. In fact, it permits the simulation or reproduction of different conditions of use of a tyre, whether it is in terms of speed, load or skid angle.

However, such test rigs do not allow all of the conditions of use of the tyres mounted on the undercarriage of the aircraft landing gear to be simulated.

Currently, the manufacturers of such tyres test their tyres to the limits of use of their test rigs and provide the measurement data gathered to the aircraft manufacturers. This data may be then analysed so that it is more representative of conditions similar to the actual conditions. In this way, it is possible to carry out first measurements with a known tyre, and then replace this tyre with a tyre to be tested. Second measurements may then be made with this tyre to be tested, by attempting to reproduce the first measurements. The comparison between these different measurements permits a better understanding of the behaviour of the tyre to be tested. Nevertheless, it is difficult to reproduce identical tests conditions. Furthermore, the measurements cannot be made tyre by tyre due to the size and installation of the sensors. These measurements are therefore only the reflection of a mean of the characteristics of such tyres.

To carry out tests in actual conditions the field of use of their tyres, the aircraft manufacturers use, in addition, extrapolation techniques. For safety reasons, they increase the measured data. Such measured data is also used to construct a simulation model of the behaviour of the aircraft when it is assembled. Such over-dimensioning further reduces the representativeness of the extrapolations which are carried out in this way.

The purpose of this invention is a mobile test rig for tyres, for example aircraft tyres, and an implementation process for it which permits these various problems to be overcome.

DESCRIPTION OF THE INVENTION

The invention proposes a mobile test rig for tyres, characterised in that it is composed of a self-driven platform, capable of following rectilinear and circular trajectories, which comprises:
  a test instrument module for a wheel-tyre assembly to be tested which permits this assembly to be orientated in all directions, to lean it and apply a vertical effort to it,
  first swivelling axles, equipped with suspensions and driving wheels,
  a processing unit associated to memory means,
  control means of the test cycle permitting the orientation of the said assembly to be controlled, as well as the load applied to it.

Advantageously this test rig may further comprise acquisition and trajectory control means associated to a positioning system, radio communication means permitting communication with a control unit, and swivelling second axles equipped with suspensions and non driving wheels. It may also be controlled remotely. It may be transported.

In one advantageous embodiment, each axle is equipped with four wheels. The said test rig comprises eight axles equipped with driving wheels, and four axles equipped with non driving wheels. The instrument module comprises a first actuator permitting the vertical efforts applied to the tyre to be tested to be generated, and at least one second actuator enabling it to be angled. Two diesel motors drive at least two hydraulic pumps, one for the left portion of the platform, one for the right portion. Each axle is equipped with an actuator to adjust the height of the platform. At least one camera allows the trajectory of the test rig to be monitored, and at least one camera permits the evaluation of the deformations of the tyre to be tested.

The said test rig comprises traction/compression sensors located at the interface of the wheel spindle equipped with the tyre to be tested and the fork holding it. It comprises for example:
  two sensors to measure the longitudinal effort and the moment around the vertical axis,
  two sensors to measure the vertical effort and the moment around the longitudinal axis,
  a sensor to measure the lateral effort,
  a sensor to measure the moment around the lateral axis,
  a sensor to measure the braking torque.

The said test rig comprises a flashing light type signalling system, and a warning siren.

Advantageously the instrument module comprises an actuator assisted by fixed and/or removable ballasts which permit the vertical efforts applied to the tyre to be tested to be generated.

The test rig can be dismantled and is formed by three balanced sections: two half platforms and the instrument module, wherein the two half platforms are self-driven.

In one advantageous embodiment the wheel-tyre assembly to be tested is an aircraft wheel-tyre assembly.

The invention also relates to an implementation process of the previous test rig comprising the following steps:
  a positioning step for the test rig in one point of a test track,
  a learning step for an ideal trajectory of the test rig, at low speed on the longitudinal axis of the test track,
  one or more test steps each comprising:
  a speeding up phase of the test rig,
  a test phases during which a series of skid angles of the tyre to be tested, pre-programmed and uploaded to the test rig, is launched,
  a stop phase.

The test rig of the invention permits all of the conditions of use of a tyre to be tested to be reproduced, including the most extreme in terms of vertical load, skid angle and speed. This test rig enables this tyre to be tested directly on the landing runways: in cold or hot weather, or dry or deteriorated (frost, rain, etc.) runways.

The test rig of the invention advantageously permits:
to test aircraft tyres of sizes of up to 60" (1.524 m),
to test a tyre on different surfaces that are characteristic of airport runways for rectilinear and/or circular trajectories,
to run a tyre at different stabilised speeds (maximum rectilinear speed of 90 km/h; maximum circular speed of 29.5°/s) or for braking phases in a rectilinear trajectory,
to apply a vertical load of 1 to 75 tons to a tyre, where the applied maximum load depends on the type of tyre in question and that may be limited to 45 tons for speeds greater than 30 km/h and for circular trajectories,
to apply a tyre skid angle with respect to the trajectory of +/−90° and limited to +/−30° if the vertical load is greater than 45 tons,
to apply a camber angle of the tyre with respect to the vertical plane of +/−5°,
to test a fitted aircraft tyre that is not moving, by charging this tyre for example with 30 tons,
to test an aircraft tyre on the ground in situations of rolling, landing or take off at low speed, by charging this tyre for example with 45 tons,
to test an aircraft tyre on the ground at high speed by charging this tyre for example with 45 tons.

The test rig also permits to simulate a landing. Finally, it permits the entire braking system of the wheel-tyre assembly to be tested.

DETAILED DESCRIPTION OF SPECIFIC EMBODIMENTS

Figure 1:
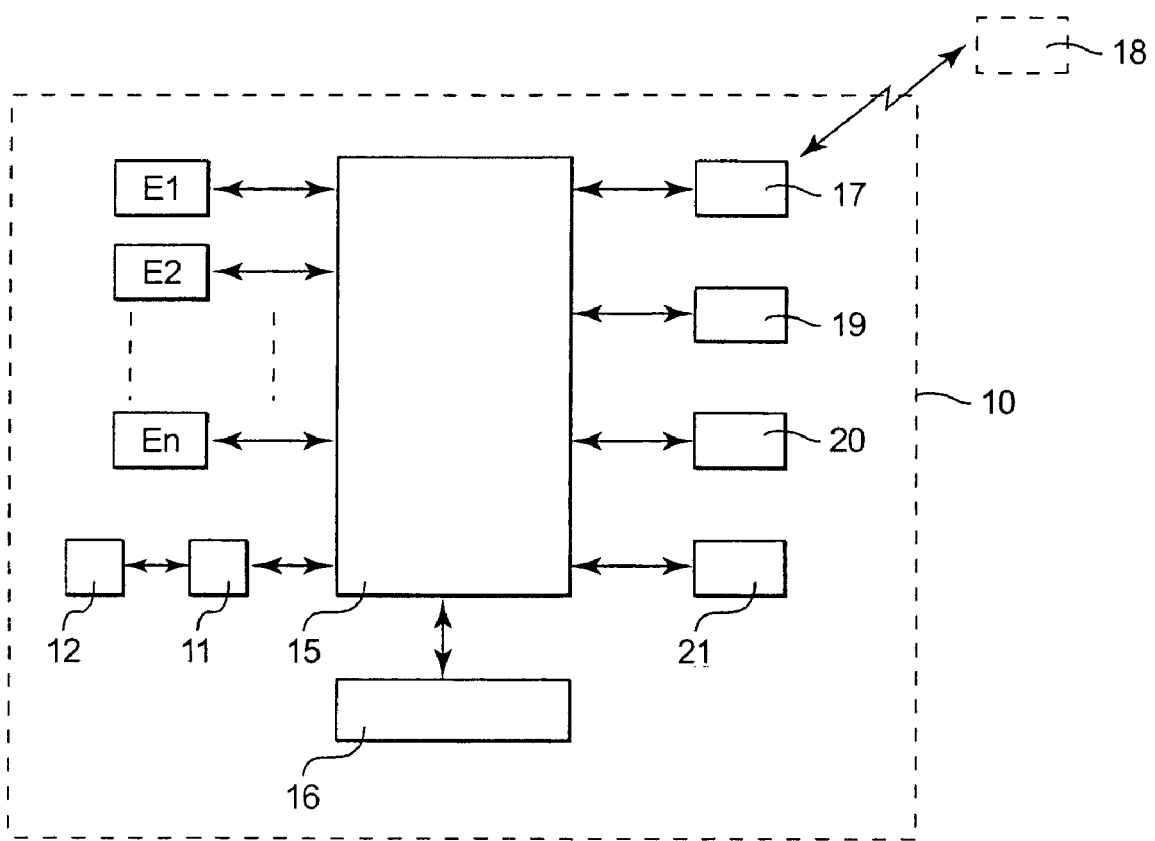
FIG. 1 illustrates a diagrammatical view of the test rig of the invention.

The mobile test rig for tyres, for example for aircraft tyres, of the invention, as illustrated in FIG. 1, is composed of a self-driven platform 10, which may be controlled remotely, capable of following rectilinear and circular trajectories, which comprises:
a processing unit 15 associated to memory means 16, which permit the following elements to be controlled,
a test instrument module 11 for a wheel-tyre assembly 12 to be tested, which permits this assembly 12 to be orientated in all directions, to angle it (or to "camber" it) and to apply a vertical effort to it,
swivelling axles with suspensions E1 ... En, equipped with driving wheels and possibly non driving wheels,
possible radio communication means 17 permitting communication with a control unit 18 located remotely,
possible trajectory acquisition and control means 19 associated to a positioning system 20,
control means 21 for at least one test cycle permitting the orientation of the said wheel-tyre assembly to be tested 12 to be controlled, and also the load applied to it.

This test rig may advantageously be transportable, for example on a semi-trailer.

Figure 2:
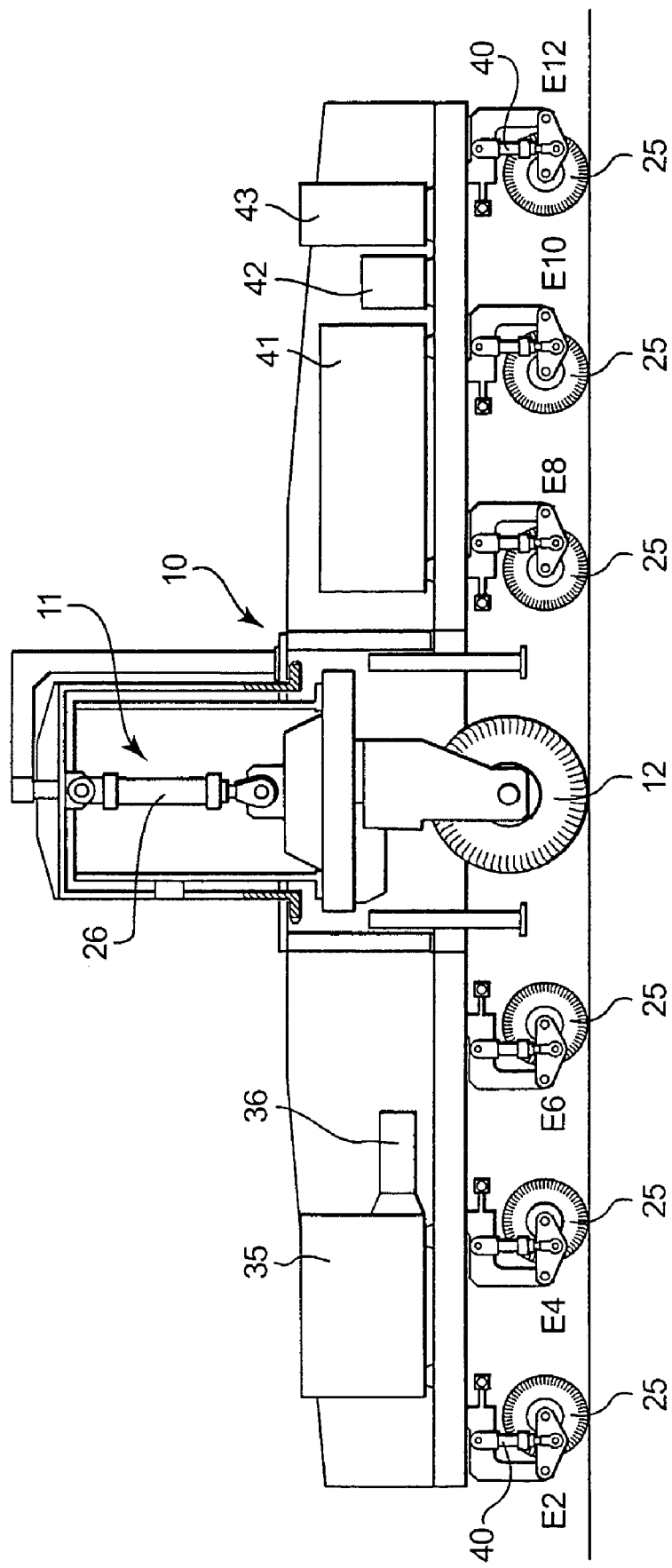
FIG. 2 illustrates a diagrammatical profile view of the test rig of the invention.
Figure 3:
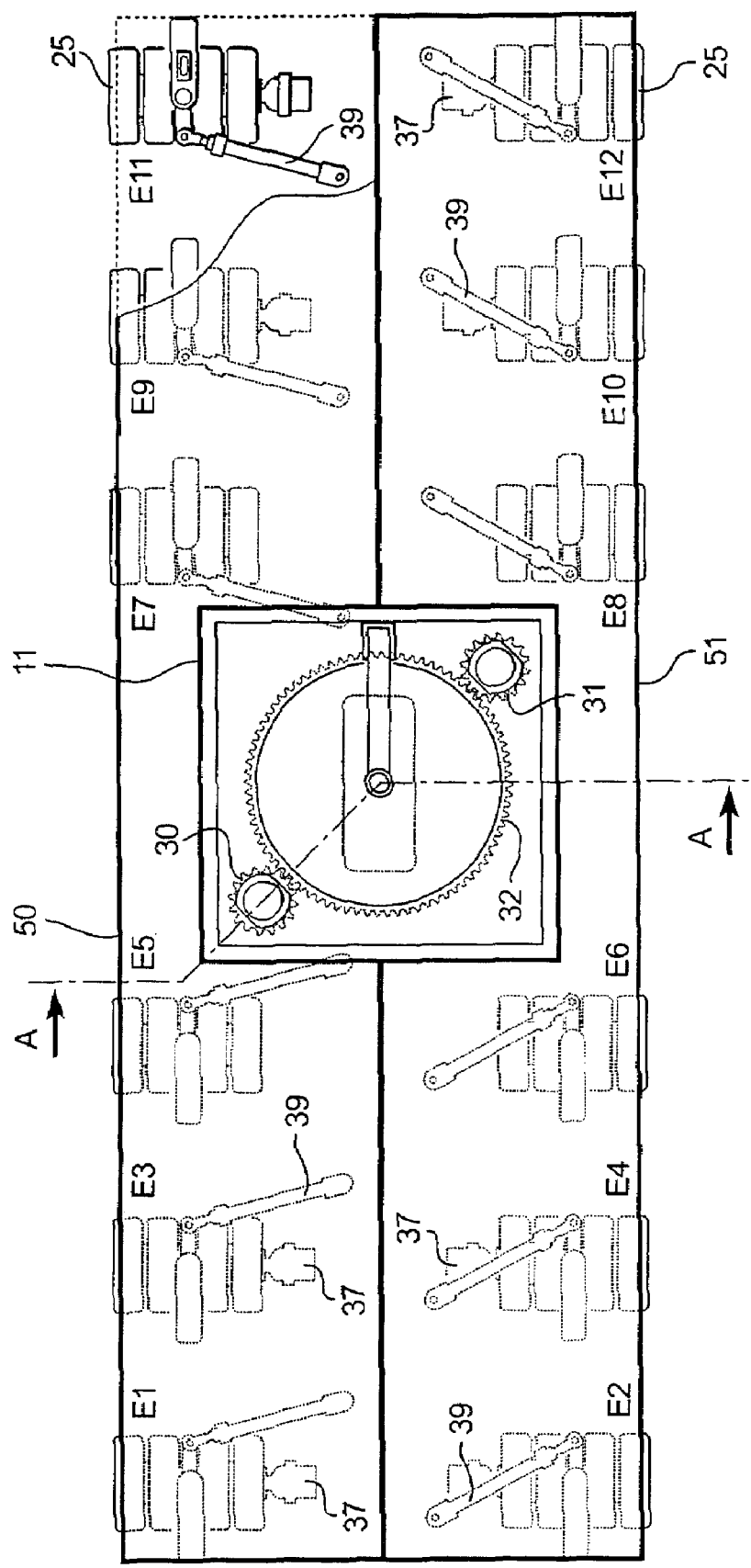
FIG. 3 illustrates a diagrammatical top view of the test rig of the invention.
Figure 4:
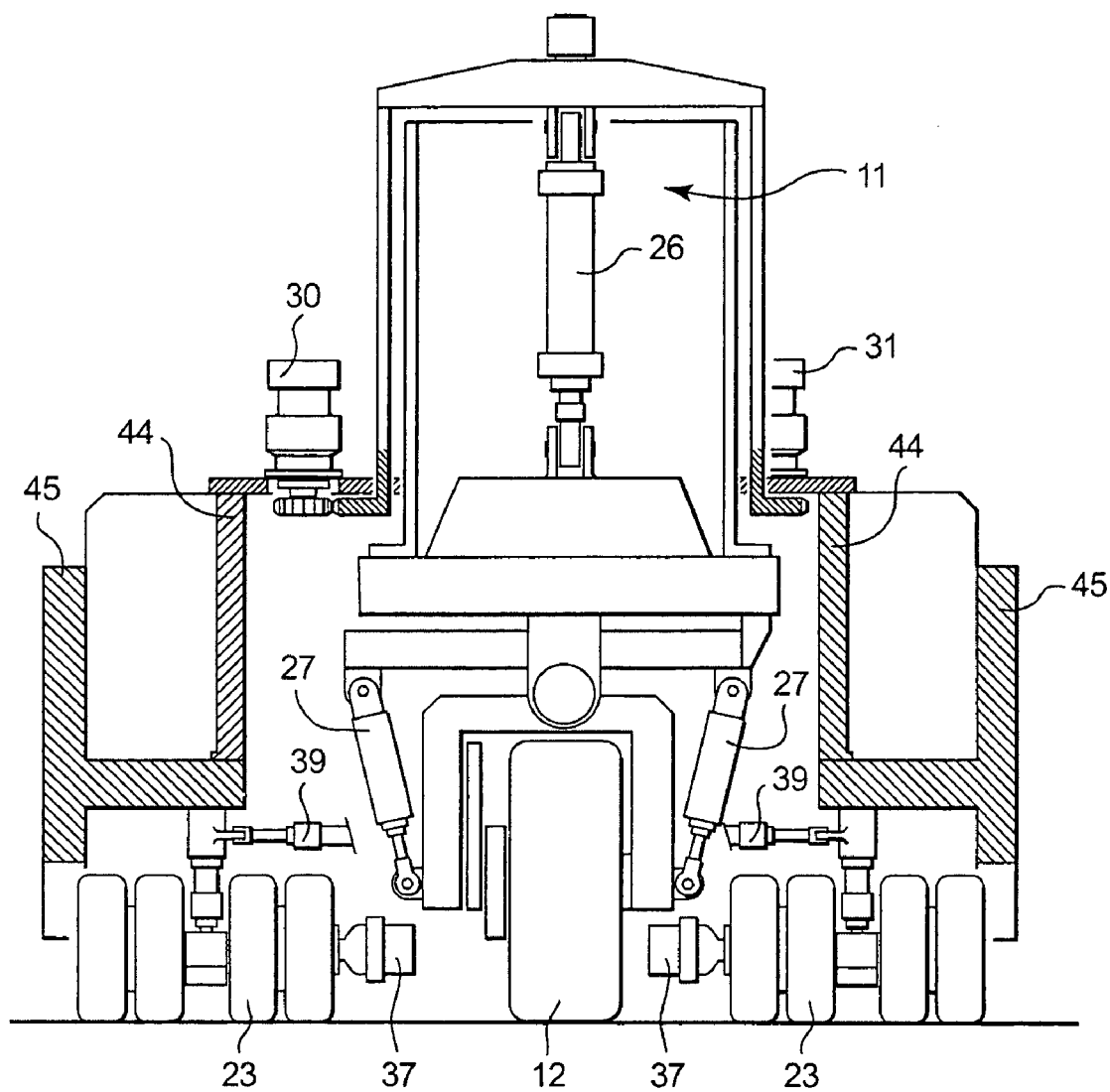
FIG. 4 illustrates a diagrammatical cross sectional view of the test rig of the invention along the section AA as shown in FIG. 3.

In the embodiment illustrated in FIGS. 2, 3 and 4, the axles, each equipped with four wheels 25, for example of a truck, have twelve references E1 to E12. In another embodiment, in the place of these twelve axles, four aircraft wheels could be used, all of them driving.

At least two of these axles, for example have eight references E3, E4, E5, E6, E7, E8, E9 and E10, equipped with gears 37, and are driven axles. The other axles E1, E2, E11 and E12 are non driving axles.

The instrument module 11 comprises one first actuator 26 permitting vertical efforts to be generated, applied to the tyre to be tested 12, and at least one second actuator 27 permitting it to be inclined.

Crown wheel 32 gears 30 and 31 permit the tyre to be tested 12 to be swivelled in all directions.

Two diesel motors 35 drive at least two hydraulic pumps 36: one for the left part of the platform 10, another for the right part for to transmit the movement to the driving axles by means of the hydraulic motors 37.

A regulation circuit permits the orientation of the axles E1 to E12 to be controlled by means of the actuators 39. Each of these axles has in addition a suspension system permitting the height de the platform 10 to be adjusted by means of an actuator 40. Support wheels, for example eight, not shown in the figures, may also be provided.

Various other elements are also illustrated in FIG. 2, i.e.:
a hydraulic tank 41 which contains the hydraulic circuit fluid in reserve, and which acts as a temperature buffer,
an oil cooling system 42,
an electrical housing 43 which powers all of the control means.

In the centre of the platform, the instrument module 11 is located comprising the tyre to be tested 12. During skidding operations, the non driving wheels are orientated so that they generate a lateral effort opposite to the lateral effort generated by the wheel-tyre assembly to be tested.

The vertical efforts applied to the tyre to be tested are created by the first actuator 26 assisted by fixed or removable ballasts 44 and 45 illustrated in FIG. 4.

The test rig of the invention permits the efforts generated by the tyre to be measured at the tyre/ground contact.

The values measured by the test rig are:
the torque of the efforts in the centre of the wheel-tyre assembly to be tested in a wheel reference,
the actual trajectory of the test rig,
the actual skid angle,
the actual camber angle,
the braking torque of the wheel equipped with the tyre to be tested,
the temperature of the braking device,
the vertical load applied to the tyre to be tested,
the deformations of the tyre to be tested obtained using cameras,
the pressure of the tyre to be tested.

The size problem present on the test rigs of the prior art for attaching sensors is no longer present. The test rig of the invention has enough space to be equipped with sensors.

This test rig may be dismantled into three parts (half platform 50, half platform 51 and instrument module 11) illustrated in FIG. 3, so that it is easier to transport. These three parts are balanced so that there is no risk of it tipping over.

An implementation process for the test rig of the invention comprises the following steps:

- a step for positioning the test rig in one position on a test track, after its various parts have been assembled,
- a learning step for an "ideal" trajectory, by moving the test rig along the longitudinal axis of the track at low speed, with acquisition of the points on this trajectory by using a positioning system, for example of the GPS ("Global Positioning System") type,
- one or several test steps each comprising:
- a phase of speeding up the test rig, during which a camber angle and a vertical load may be applied to the tyre to be tested, where a zero skid angle is determined, and where the test rig is accelerated up to a set speed.
- a test phase during which, when the test speed is reached, a series of skid angles, pre-programmed and uploaded to the test rig, is launched with periods where the set skid angle is maintained for given durations with or without braking of the wheel equipped with the tyre to be tested,
- a stop phase, which consists of braking of the hydraulic motors, and resetting of the skid angle.

In the event of failure of one of the hydraulic motors, the wheel equipped with the tyre to be tested is also braked. During this stop phase, the control means hold the test rig on the "ideal" trajectory. A safety stop may be triggered automatically when a risk of going off the track is identified by the control means or the supervising operator.

Example of One Advantageous Embodiment

In this embodiment, the test rig of the invention comprises one self-driven platform composed of two half platforms located on either side of the instrument module.

This test rig may be defined as follows:

1) Main Characteristics

This test rig is equipped with twelve suspended, swivelling axles; wherein each axle is equipped with four tyres of the "Michelin 245/70 R17,5 XTE2" type, inflated with Nitrogen.

Two programmable logic controllers control each orientation distributor by an axis controller, where the measurement return is provided by an absolute encoder fitted to the axle in question.

The assembled test rig has a length of 14 m, a width of 4.5 m and a height of 5.5 m. Its weight varies, depending on whether there is ballast or not, from 60 tons to 190 tons.

This dismantled test rig is composed of the following parts in particular:

two half platforms with the following characteristics:
weight <35 tons,
length: 14 metres,
width: 2.4 m,
height <3.7 m;
An instrument module (lower part) with the following characteristics:
weight <10 tons,
length: 2.3 m,
width: 2 m,
height <3 m.
An instrument module (upper part) with the following characteristics:
weight <15 tons,
length: 3 m,
width: 3 m,
height <3.5 m;
"Dead weight" ballasts made of steel plates each weighing approximately 4.5 tons, where each plate has the following dimensions: height: 0.2 m; length: 2.85 m; width: 1 m; where these plaques form two sets of 27.5 tons (Weight <55 tons).
A control unit with the following characteristics:
weight <2 tons,
length: 4.41 m,
width: 2.44 m,
height <2.61 m.

2) Drive

This test rig is driven by two thermal engines which actuate two hydraulic pumps. These pumps drive eight hydraulic motors with secondary regulation power transmission on the driving axles. The pressure in the hydraulic circuit is maintained at a value that is virtually constant. There is consequently no variation in the volume due to the compressibility of the fluid used. The harmonic frequency of a power transmission geared motor assembly is practically taken to an infinite value. It is therefore possible to adjust the dynamic speed with rapidity and precision.

Self-regulating variable capacity piston pumps are used (which maintain the pressure and cancel the flow).

The motors are variable capacity motors which have the following advantages. They are used for the front and rear translation movements of the platform by simply inverting its capacity and its braking. In the braking phase, the capacity of the motors is also inverted, and that of the pumps is taken to zero. The motors then operate as pumps and the energy is downgraded on pressure limiting switches.

The capacity of the motors is regulated at all times by means of a speed servo circuit. The set speed is defined to suit the test to be carried out.

3) Control

The test rig control allows three objectives to be achieved:
- the platform to be driven and the supply of all the information related to its operation (alarms, alerts, etc.),
- a complete autonomous test cycle to be carried out under human supervision and automatic control,
- the safety of the persons and equipment during testing.

The test rig is thus characterised by the absence of an on board human operator. During testing, the system is driven by two on board programmable logic controllers and follows an "ideal" trajectory. Located remotely in a control unit, an operator has a driving console permitting the operating modes to be selected, an analogue joystick with two translation/direction axes and two push buttons for starting and stopping the test.

The communication between the control unit and the platform is via independent radio connections which permit:
- the transmission of the running and measurement incorporating video transmission channels,
- the safety transmission (priority commands).

The axles of the platform are grouped into four groups of three axles: a front left group, a front right group, a rear left group and a rear right group.

For the rectilinear trajectories, the axles of a same group are connected mechanically by connecting rods. Consequently they have the same orientation instruction, which is the mean of the independent operating values.

A learning test for the ideal trajectory is carried out at the start of each test of campaigns at low speed on the longitudinal axis of the track. A DGPS system ("Differential Global Positioning System") permits the points of this trajectory to be acquired and the determination of the course of the track.

During rectilinear testing, the programmable logic controllers identify, thanks to the DGPS measurements and the velocimeter measurements, the actual trajectory and the course followed. In comparison with the measurements of the learning test, the control automatically determines the corrective angles to be applied to each of the groups of axles in order to bring the rig tests onto the ideal trajectory.

This test rig also permits a landing simulation to be made, the purpose of which is to bring the tyre to be tested in contact with the ground for platform translation speeds of more than 55 km/h and a vertical impact speed of around of 3 m/s.

A sequence of specific tests may then be broken down into three phases:

- a phase of speeding up of the test rig during which the camber angles are set to zero, where no vertical load is applied to the tyre to be tested, and the test rig is accelerated up to the set speed,
- a test phase during which a skid angle may be applied to the tyre to be tested in a field limited to +/−10°, when the test speed is reached, where the wheel equipped with the tyre to be tested is brought into contact with the ground at a vertical speed of 3 m/s, a series of skid angles, pre-programmed and uploaded on to the test rig, may then be started by stages where the set skid angle is maintained for set durations, where this wheel may or may not be braked,
- a stop phase, which consists of braking the hydraulic motors, and resetting of the skid angle.

The wheel-tyre assembly to be tested is equipped with the existing braking device of the aircraft, which allows this device to be tested, and in particular the anti-locking system.

4) Supervision of a Test

At the start of a test, a screen for rereading the data of a test sequence (kinematics of the platform, skid start command, etc. . . . ) permits the test supervisor in the control unit to validate this sequence prior to the test being carried out (taking into account his experience or previous events). Such a simulation permits confirmer the suitability of the sequence with the test track.

The test sequence is then uploaded, by radio transmission, to the programmable logic controller of each of the two half platforms. One of the programmable logic controllers is considered as the "master" and the other as the "slave". The operator starts the test by pressing the Start push button. The "master" programmable logic controller carries out the series of the test sequence. The dynamic trajectory control acts directly on the steering angles of the platform wheels to counter the lateral effort generated by the skid orientation of the wheel equipped with the tyre to be tested. It thus optimises the following of the trajectory imposed by the operator by maintaining a constant speed if the rated power allows this (otherwise the speed will be endured).

During the entire test sequence, the operator observes the trajectory followed with the aid of cameras installed on the test rig. Cameras are also positioned on the test rig, which allow the deformations of the tyre to be tested to be assessed. In the event of deviation from the trajectory, the operator can, from the control unit, correct this trajectory using the joystick. A specific video link provides the communication between the on board video system and video unit installed in the control unit. The operator can display the image from one or more cameras on his screen. A "tracking vehicle" to follow the test rig is therefore not required.

During the movement, information on the state of the driving actuators and sensors is transmitted to the control unit so that the supervisor can monitor the change in the values measured.

The "master" programmable logic controller may be informed of the loss of the safety link by resetting of the signals (delay adjustable from 0.5 to 4 s to inhibit any possible micro-cutouts) and may then trigger a procedure for stopping the test rig according to pre-defined conditions.

The cancellation of a test and the procedure for stopping the test rig may also be triggered by the operator from the control unit by means of a stop push button and transmitted by the safety system.

Automatic safety procedures are used by the programmable logic controllers to restrict critical situations during testing, especially limiting of the skid angle of the platform wheels to suit its speed, limiting of the brutal trajectory correction and limiting of the duration of the test for large skid angles of the wheel equipped with the tyre to be tested.

In addition to the relative measurements of the tyre to be tested, different values are measured in order to make possible dynamic control of the test rig and supervision of the test in the control unit, which is to say:

the movement speed of the test rig,
the distance traveled by it,
its longitudinal and lateral accelerations,
the trim of the platform (pitch and toss),
the height of the platform,
the actual trajectory of the platform,
the course of the platform.

5) Operating/Driving Modes

Different operating/driving modes have been defined:

A decoupled mode, in which each half platform is self-driven and has a programmable logic controller: in the assembly/dismantling phase, the two half platforms are decoupled and are piloted independently by a local control panel. In this mode, only the translation and direction movements are authorised at low speed. In the assembly phase, once the two half platforms have been assembled around the instrument module, inter-link cables are connected, the rig is then considered as assembled. The decoupled mode is then prohibited and only the control panel of the "master" programmable logic controller can be used.

A local manual mode, in which the control panel connected to the "master" programmable logic controller enables access to all of the movements that may be made by the test rig. The control panel is mobile and is connected to the electrical cabinet by a cable of approximately 3 m. It permits the test rig to be put into operation or isolated, front/rear translation, left/right rotations of the direction (with display of the angle of rotation of the platform axles, height adjustment of the platform and the wheel equipped with the tyre to be tested). The translation and direction movements are limited to low speeds.

A remote manual mode, which is a similar mode to the previous one but which is piloted directly from the control unit.

An automatic mode, which is the operating mode of the test rig to carry out the tests on the tyre to be tested.

6) Man/Machine Interface

In the control unit, the operator has a PC ("Personal Computer") type computer terminal which provides the driving interface, which permits:

the parameters to be set and monitoring of the tests profiles,
a choice of the operating/driving mode,
a display on a panel of the states and values of the driving actuators and sensors,
a report of the faults and alarms.

The operator also has a PC type computer terminal which provides the measurement interface, which permits:

the storage of the data acquired on the test rig, certain data may however be transmitted to the control unit by radio in order to make real time supervision of the test possible, the memorisation, at the end of the test, of the data gathered on a computer support.

A video bay provides the following functions:

acquisition of the images transmitted by radio from the on board cameras, display on a colour screen or one or several images, control of the zoom adjustment, the site and orientation of each camera.

7) Instrumentation

The torque of the efforts generated by the tyre to be tested is determined by specific instrumentation located as close as possible to the centre of the wheel equipped with the tyre to be tested, where the torque is to be calculated. Traction/compression sensors are situated at the interface of the spindle of the wheel equipped with the tyre to be tested and the fork holding this wheel, for example:

two sensors to measure the longitudinal effort and the moment around the vertical axis (self-alignment torque), a two sensors to measure the vertical effort and the moment around the longitudinal axis, one sensor to measure the lateral effort, one sensor to measure the moment around the lateral axis, one sensor to measure the braking torque.

Encoders are used on different parts of the test rig to determine different values (the travel of the orientation actuators, the speed of the platform wheels, etc.) making possible dynamic control of the test rig.

According to the test sequences carried out, ranges of interchangeable sensors are made available in order to measure, as accurately as possible, the efforts developed by the tyre to be tested.

8) Assembly of the Rig

The instrument module is composed of two specific entities:

a fork which permits the wheel equipped with the tyre to be tested to be positioned in different angular configurations and in which are situated the sensors for the efforts to be measured, where the skid angle orientation crown wheel is connected to the fork, a cylindrically shaped part, situated above the fork, which is made up of the actuator which permits both the height of the fork to be adjusted and the vertical effort to be applied.

A crane is required for the handling and assembly of this module and the two half platforms.

The instrument module is then surrounded by the two self-driven half platforms. They are first bolted together along the entire length of the test rig. Then they are bolted to this module.

The said crane is also required for handling the ballast to be used on the platform. The quantity of ballast to be installed depends on the test sequence chosen.

9) Signals-Lighting

The test rig is equipped with a flashing light type signal system to indicate that it is operating, and possibly a siren.

The test rig is equipped with two 300 W lights and fluorescent tubes in the electrical cabinets.

REFERENCES

[1] U.S. Pat. No. 4,238,954
[2] RU 2 085 891

The invention claimed is:

1. A mobile test rig for testing a wheel-tire assembly, said test rig comprising:
    a self-driven platform, capable of following rectilinear and circular trajectories on a test track,
    an instrument module mounted on said platform and configured to test said wheel-tire assembly, said instrument module being configured to place the wheel-tire assembly in contact with said test track, to orient said wheel-tire assembly in all directions, to lean the wheel-tire assembly, and to apply a vertical effort to the wheel-tire assembly;
    first swivelling axles mounted to said platform and equipped with suspensions and driving wheels in contact with said test track;
    a processing unit associated to a memory and configured to control said instrument module and said first swiveling axles; and
    means for controlling a test cycle permitting orientation of the wheel-tire assembly, and a load applied to said assembly.

2. The test rig of claim 1, further comprising acquisition and trajectory control means associated to a positioning system.

3. The test rig according to claim 1, wherein said platform includes means for being piloted remotely.

4. The test rig of claim 3, further comprising radio communication means for permitting communication with a control unit.

5. The test rig of claim 1, which can be transported.

6. The test rig according to claim 1, further comprising second swivelling axles, equipped with suspensions and non driving wheels.

7. The test rig according to claim 1, in which each axle is equipped with four wheels.

8. The test rig of claim 7, which comprises eight axles equipped with driving wheels, and four axles equipped with non-driving wheels.

9. The test rig of claim 1, in which the instrument module comprises one first actuator permitting vertical efforts applied to the tire to be tested to be generated and at least one second actuator permitting the tire to be leant.

10. The test rig of claim 1, further comprising two diesel motors driving at least two hydraulic pumps, one for a left part of the platform, one for a right part of the platform.

11. The test rig according to claim 1, in which each axle is equipped with an actuator for adjusting height of the platform.

12. The test rig of claim 1, further comprising at least one camera permitting the trajectory to be monitored, and at least one camera permitting deformations of the tire to be tested to be assessed.

13. The test rig of claim 1, further comprising traction/compression sensors situated at an interface of a spindle of a wheel equipped with the tire to be tested and a fork holding the tire.

14. The test rig of claim 8, further comprising:
    two sensors to measure longitudinal effort and moment around the vertical axis;
    two sensors to measure the vertical effort and moment around the longitudinal axis;
    one sensor to measure lateral effort;
    one sensor to measure moment around the lateral axis;
    one sensor to measure braking torque.

15. The test rig of claim 1, further comprising a flashing light signal system, and a siren.

16. The test rig of claim 1, in which the instrument module is situated in a center of the platform.

17. The test rig of claim 1, in which the instrument module comprises an actuator assisted by fixed and/or removable ballasts permitting vertical efforts applied to the tire to be tested to be generated.

18. The test rig according to claim 1, which can be dismantled and that is formed by three balanced parts of two half platforms and the instrument module.

19. The test rig of claim 18, in which the two half platforms are self-driven.

20. The test rig according to claim 1, in which the wheel-tire assembly to be tested is an aircraft wheel-tire assembly.

21. A process of testing a tire with a test rig, said method comprising:
positioning the test rig in one position of a test track;
learning an ideal trajectory, by moving the test rig at low speed along a longitudinal axis of the track, with acquisition of points of the trajectory using the positioning system; and
performing one or more test steps.

22. The process of claim 21, wherein each test step comprises:
speeding up the test rig;
launching a test phase during which a series of skid angles of the tire to be tested are pre-programmed and uploaded onto the test rig; and
stopping said test phase.

23. A test rig for testing a tire, said test rig comprising:
means for positioning the test rig in one position of a test track;
means for learning an ideal trajectory, by moving the test rig at low speed along a longitudinal axis of the track, with acquisition of points of the trajectory using the positioning system; and
means for performing one or more test steps.

24. The test rig of claim 23, further comprising means for launching a test phase during which a series of skid angles of the tire to be tested are pre-programmed and uploaded onto the test rig.

25. The test rig of claim 1, wherein said self-drive platform comprises four groups of axles including, relative to said wheel-tire assembly to be tested, a front left group, a front right group, a rear left group, and a rear right group.

26. The test rig of claim 25, wherein each of said four groups of axels includes three axles.

27. The test rig of claim 1, wherein said instrument module includes a position system configured to determine a trajectory of said wheel-tire assembly on said test track.

28. The test rig of claim 27, wherein said position system is a differential global positioning system.

29. The test rig of claim 27, further comprising a programmable logic control configured to compare an actual trajectory of said wheel-tire assembly on said test track to a predetermined trajectory, and to apply corrective angles to said first swiveling axles in order to bring the test rig onto said predetermined trajectory.

* * * * *